United States Patent
Anderson et al.

(10) Patent No.: US 10,158,527 B2
(45) Date of Patent: Dec. 18, 2018

(54) CHANGING AN EXISTING BLOCKCHAIN TRUST CONFIGURATION

(71) Applicant: International Business Machines Corporation, Armonk, NY (US)

(72) Inventors: Sheehan Anderson, Durham, NC (US); Konstantinos Christidis, Durham, NC (US); Anna D. Derbakova, Durham, NC (US); Nitin Gaur, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 15/337,186

(22) Filed: Oct. 28, 2016

(65) Prior Publication Data

US 2018/0123882 A1    May 3, 2018

(51) Int. Cl.
*H04L 12/24*    (2006.01)
*H04L 12/26*    (2006.01)
*G06F 17/30*    (2006.01)

(52) U.S. Cl.
CPC .......... *H04L 41/0813* (2013.01); *H04L 43/16* (2013.01); *G06F 17/30371* (2013.01); *G06Q 2220/00* (2013.01); *H04L 2209/56* (2013.01)

(58) Field of Classification Search
CPC ...... H04L 41/0813; H04L 43/16; H04L 41/16
USPC ........................................................ 709/221
See application file for complete search history.

(56) References Cited

U.S. PATENT DOCUMENTS

| 2004/0136533 | A1* | 7/2004 | Takagaki | H04L 9/0891 380/255 |
| 2015/0379510 | A1 | 12/2015 | Smith | |
| 2016/0028552 | A1 | 1/2016 | Spanos et al. | |
| 2016/0224949 | A1 | 8/2016 | Thomas et al. | |

FOREIGN PATENT DOCUMENTS

WO    2015175722 A1    11/2015

OTHER PUBLICATIONS

Ethereum Stack Exchange, Why does Ethereum plan to move to Proof of Stake, Jan. 20, 2016, ethereum.stackexchange.com, https://ethereum.stackexchange.com/questions/9/why-does-ethereum-plan-to-move-to-proof-of-stake.*

Ronald Chan, Consensus Mechanisms used in Blockchain, May 2, 2016, Linkedin, https://www.linkedin.com/pulse/consensus-mechanisms-used-blockchain-ronald-chan.*

(Continued)

*Primary Examiner* — David R Lazaro
*Assistant Examiner* — Zi Ye

(57) ABSTRACT

Operating conditions of a blockchain configuration may be dynamic and change automatically under certain circumstances. One example method of operation may include one or more of identifying an existing consensus procedure used in an existing blockchain configuration, identifying current metrics associated with the existing blockchain configuration, comparing the current metrics to predefined rules, identifying one or more deviations based on the current metrics being compared to the predefined rules, and changing the existing consensus procedure to a next consensus procedure for a subsequent block in the existing blockchain configuration responsive to identifying the one or more deviations.

20 Claims, 6 Drawing Sheets

(56) References Cited

OTHER PUBLICATIONS

Ethereum Stack Exchange, What are the scalability benefits of PoS vs PoW, Feb. 14, 2016, ethereum.stackexchange.com, https://ethereum.stackexchange.com/questions/1346/what-are-the-scalability-benefits-of-pos-vs-pow.*
Kyle Torpey, Bitcoin Hard Forks May Become Safer With User Voting, Apr. 7, 2016, bitcoinmagazine.com, https://bitcoinmagazine.com/articles/bitcoin-hard-forks-may-become-safer-with-user-voting-1460040031/.*
Antonylewis2015, A gentle introduction to bitcoin, Sep. 1, 2015, Bits on blocks, https://bitsonblocks.net/2015/09/01/a-gentle-introduction-to-bitcoin/.*
Venij, PoW alternatives to avoid 51% concerns, Jun. 13, 2014, www.reddit.com, https://www.reddit.com/r/Bitcoin/comments/281ws5/pow_alternatives_to_avoid_51_concerns/ (Year: 2014).*

\* cited by examiner

CHANGING AN EXISTING BLOCKCHAIN TRUST CONFIGURATION

TECHNICAL FIELD

This application relates to dynamically changing a blockchain trust configuration and more specifically to changing an existing blockchain trust configuration to a different trust configuration based on recent changes to the blockchain requirements and/or architecture.

BACKGROUND

In a blockchain configuration, there is often a motive to change a consensus algorithm after some period of time. For example, many public blockchains utilize a Proof Of Work (POW) as their initial consensus algorithm, but may later wish to switch to Proof Of Stake (POS) as the value of their underlying crypto-currency increases. Another example is a private blockchain that chooses an algorithm such as Practical Byzantine Fault Tolerance (PBFT), which may work well for small networks with a small number of nodes, but present scalability challenges as the number of nodes expands. This change usually means re-architecting an application, redesigning of blockchain infrastructure, re-provisioning of a new infrastructure and/or migrating of a validated transaction chain or blockchain. All such changes can be expensive and unachievable.

SUMMARY

One example embodiment may include a method that comprises one or more of identifying an existing consensus procedure used in an existing blockchain configuration, identifying current metrics associated with the existing blockchain configuration, comparing the current metrics to predefined rules, identifying one or more deviations based on the current metrics being compared to the predefined rules, and changing the existing consensus procedure to a next consensus procedure for a subsequent block in the existing blockchain configuration responsive to identifying the one or more deviations.

Another example embodiment may include an apparatus that comprises one or more of a processor configured to identify an existing consensus procedure used in an existing blockchain configuration, identify current metrics associated with the existing blockchain configuration, compare the current metrics to predefined rules, identify one or more deviations based on the current metrics being compared to the predefined rules, and change the existing consensus procedure to a next consensus procedure for a subsequent block in the existing blockchain configuration responsive to the one or more deviations being identified.

Another example embodiment may include a non-transitory computer readable storage medium configured to store instructions that when executed causes a processor to perform one or more of identifying an existing consensus procedure used in an existing blockchain configuration, identifying current metrics associated with the existing blockchain configuration, comparing the current metrics to predefined rules, identifying one or more deviations based on the current metrics being compared to the predefined rules, and changing the existing consensus procedure to a next consensus procedure for a subsequent block in the existing blockchain configuration responsive to identifying the one or more deviations.

DETAILED DESCRIPTION

Figure 1:
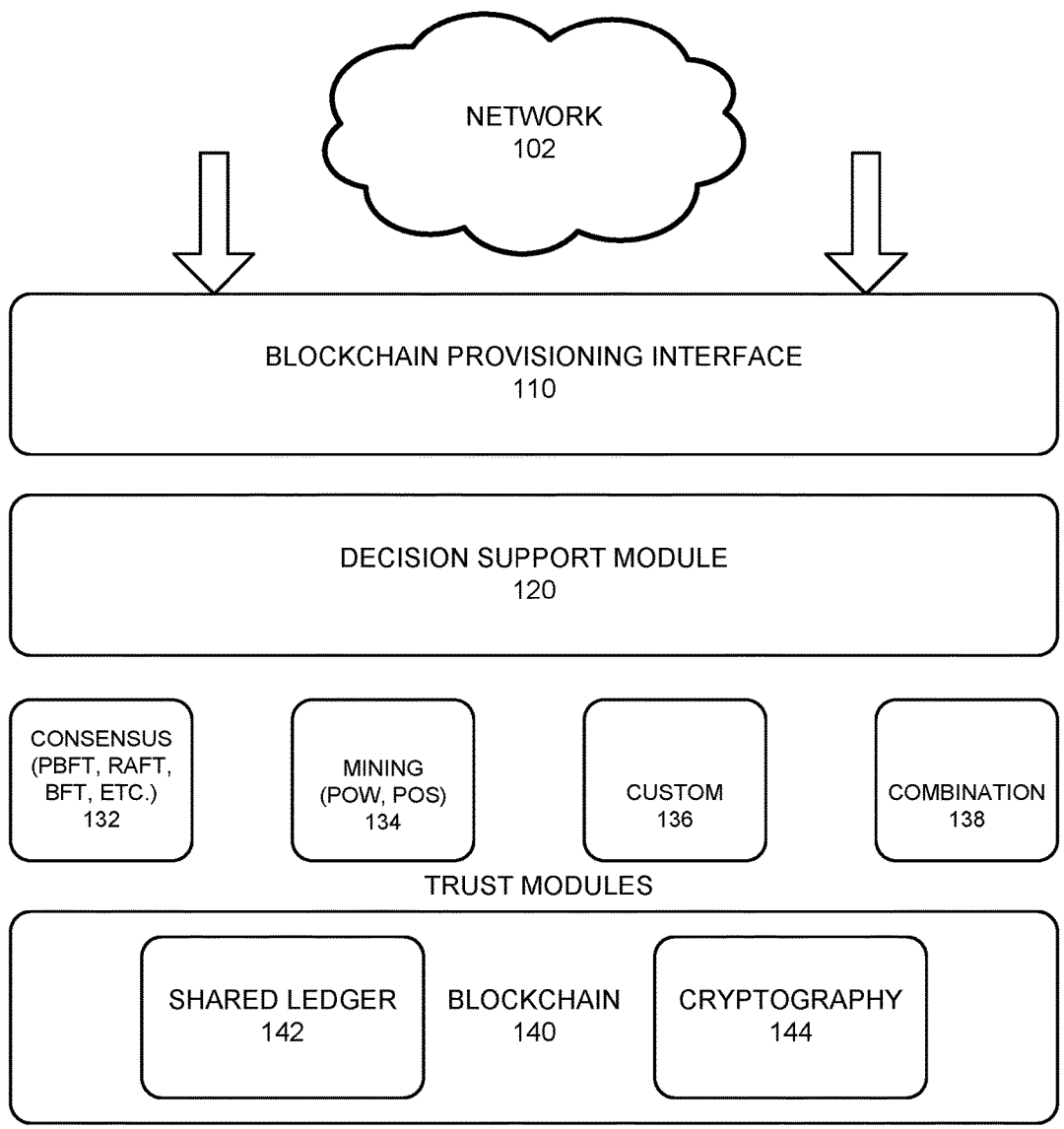
FIG. 1 illustrates a logic block diagram of a blockchain configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which identifies an existing blockchain trust configuration and changes the blockchain trust configuration (for example, based on an action, dynamically, etc.) while preserving the integrity of the processed transaction in the block. Preserving the existing blocks in the blockchain is required by large-scale enterprise blockchain projects due to longevity requirements of the blockchain platform. According to one example, the blockchain can dynamically switch consensus procedures or algorithms based on factors such as performance metrics, asset values, and other user-defined rules. In operation, upon creating a blockchain, a user may define the metrics that should be tracked in order to determine whether the current consensus algorithm is acceptable. If nodes detect deviation from the metrics, they will reach a consensus to change consensus algorithms at a future block, which permits the blockchain to continue operation without interruption.

By creating blockchain activation triggers which automatically cause the consensus to change, the interruptions or slowdowns which are caused due to changes in blockchain usage or load may be reduced. Non-technical users may let the consensus rules algorithm seamlessly pick the best consensus algorithm for the current workload. Also, more technically inclined users may wish to understand why and when future consensus algorithm changes may occur. In public blockchains, changing consensus algorithms can be burdensome due to uncertainty, which impacts the integrity of the blockchain and value of the assets stored in the blockchain. If rules, describing when and why consensus algorithm changes may occur, were defined at the creation of the blockchain, the changes could be understood and handled with clarity.

In one example, the blockchain consensus application may systemically evaluate the performance and other service level agreement (SLA) related criteria or manual evaluations, employ an SME on selection of an optimized blockchain trust system for the application, deploy a chain code and blockchain trust system to validation nodes and use the consensus procedure to adopt new trusts procedures or provide a transaction or block cut-over certain predefined thresholds to use a new blockchain trust procedure. For example, when one or more metrics exceed a threshold operating level, a blockchain trust procedure may be changed from a first operating trust procedure to a different operating trust procedure. Also, a processed block may generate metadata for purposes of a stack of processes. A new blockchain trust procedure may be effective by removal of an older trust procedure.

Utilizing blockchain databases and records represent an ability that can radically improve banking, supply chains, and other transaction-based networks, by providing new opportunities for innovation and growth while reducing cost and risk. A "decentralized consensus," may be considered a key attribute of a crypto-based computing platform. Decentralized consensus breaks the old paradigm of centralized consensus, for example, when one central database rule is used for transaction validity. A decentralized scheme transfers authority and trusts to a decentralized network and enables nodes in the network and/or that communicate with the network, to continuously and sequentially record their transactions on a public "block," creating a unique "chain" or blockchain. Cryptography, via hash codes, is used to secure the authentication of the transaction source and remove the need for a central intermediary. The combination of cryptography and blockchain technology reduce a duplicate recording of a common transaction.

By establishing an overlay trust consensus for blockchain trust validation, any blockchain network trust can increase integrity with a larger number of validators. However, in order to reach consensus, a certain amount of time is required. The more validators included in a blockchain network, the more time is required to reach a consensus, which in turn decreases the network throughput. In one example, a single blockchain fabric/platform, may have validators providing validation service for more than one enterprise blockchain. The idea is to ensure that the validators themselves are not only engaged in validating and committing transactions but are also ensuring an overlay network to maintain the quality and integrity of consensus validations. Subsequently, integrating the consensus procedure in the transaction block (for example in the transaction block metadata) provides additional visibility into the history of quality of the consensus driven validation process and feedback to add/remove validators based on a feedback procedure.

In one example, every validator in the blockchain network maintains a record of all the "votes" that every other validator in the network casts. At the end of every consensus round, the validator entity will compare the votes of all validators with the decision that the network as a whole reached (i.e., the product of the consensus process). If a validator has voted differently from the majority of the network, this is noted in a "feedback registry" that every validator maintains as a "bad" vote. Once a validator crosses a certain threshold of "bad" votes, the rest of the network may wish to remove, by consensus, the current validator entity. For instance, the validator may be banned from the network or the consensus process permanently or temporarily for a certain time period of time or a number of rounds. Or, the other members of the blockchain may assign a decreased weight to the validator's votes in subsequent consensus rounds. These actions and their respective triggers are known in advance, for example, and such attributes may be defined in the blockchain's genesis block. As a result of the feedback loop, the blockchain network is able to correct itself and isolate blockchain validators. This results in optimized consensus rounds, increased throughput, and decreased response times to client requests, and also provides an incentive to all validators to conduct their validation procedure with due consideration for the blockchain members.

FIG. 1 illustrates a logic block diagram of a blockchain configuration according to example embodiments. Referring to FIG. 1, the network configuration 100 includes a network 102 which provides transaction data or other blockchain reference data to a blockchain provisioning interface 110, which may operate as part of a server or a distributed network in an enterprise or in the cloud. A decision support module 120 may process the interface data and dynamically modify the current procedures/algorithms/strategies for processing blockchain data. By its very nature, the blockchain data is highly secured and constantly updated to reflect new blockchain transactions. The various security and operating procedures included in the trust modules include 132, 134, 136 and 138 and may be selected randomly or based on predefined operating condition criteria. The blockchain 140 may include a shared ledger 142 of transactions and a particular type of cryptography 144 used for a set period of time.

Figure 2:
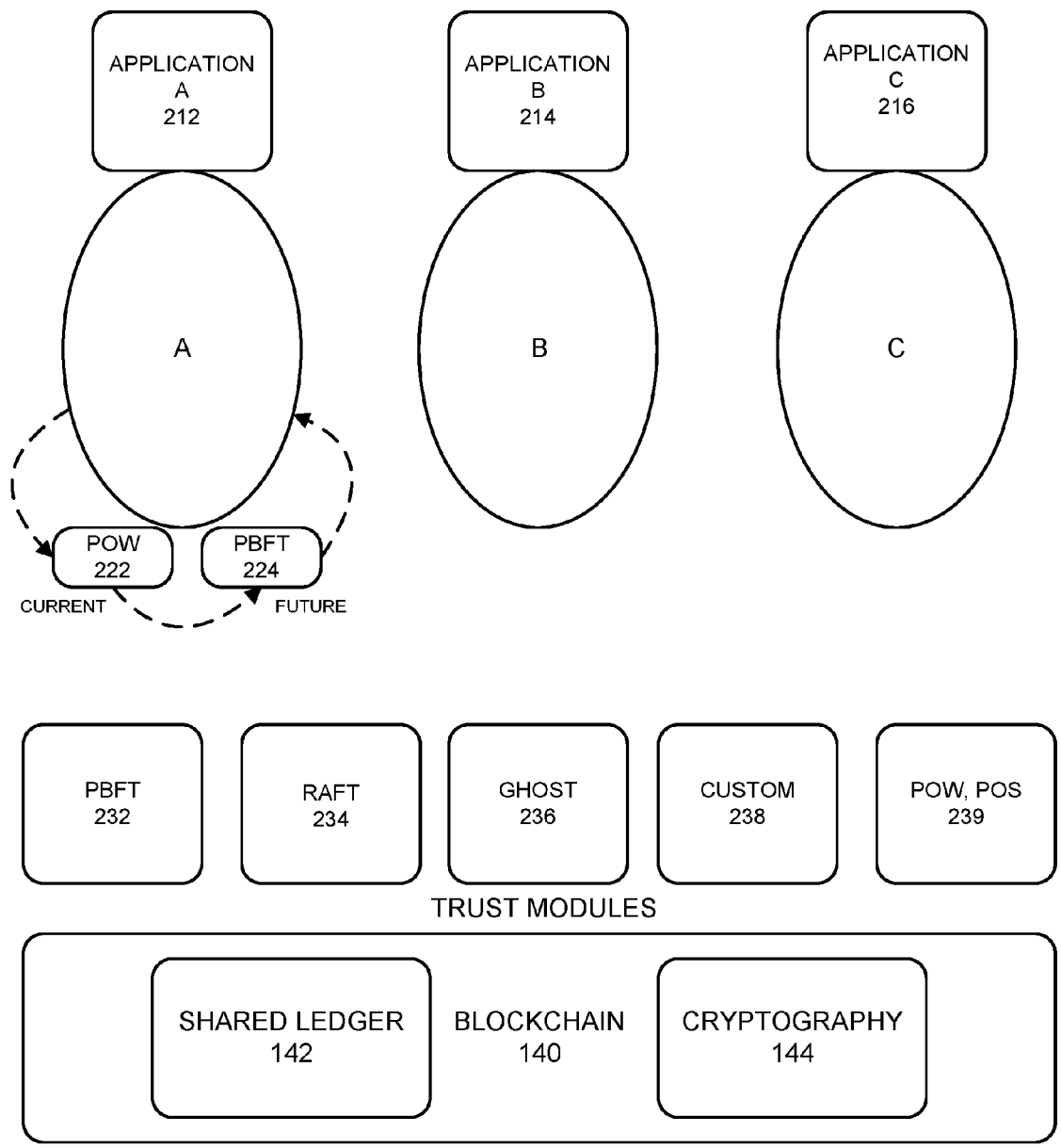
FIG. 2 illustrates a logic block diagram of a dynamic changing trust configuration according to example embodiments.

FIG. 2 illustrates a logic block diagram of a dynamic changing trust configuration according to example embodiments. Referring to FIG. 2, the trust configuration 200 includes one or more applications 212, 214 and 216 operating under a particular current trust configuration 222 and changing over to a new trust configuration 224 depending on the environmental conditions of the blockchain. In this example, the trust modules 232, 234, 246, 238 and 239 offer different security options for the blockchain. The present security consensus procedure POW 222 being used may be improper based on a number of nodes on the blockchain network or a threshold amount of currency (i.e., $1,000, 000.00) being managed by the blockchain application. In the event that the conditions require a change, a new consensus procedure may be selected (i.e., PBFT 224) and applied to the subsequent transactions for the blockchain. For instance, PBFT may be a multi-master consensus requirement requiring votes from a set number of masters (i.e., 5 out of thousands). RAFT is a leader consensus requirement requiring votes from one leader, Greedy Heaviest Observed Subtree (GHOST) is a master-less approach to maintaining a consensus, and POW or POS are also master-less in nature. The customer approach may be one of "yet to be determined" pending a user input. The blockchain 140 may include a shared ledger 142 of transactions and a particular type of cryptography 144 used for a set period of time.

Figure 3:
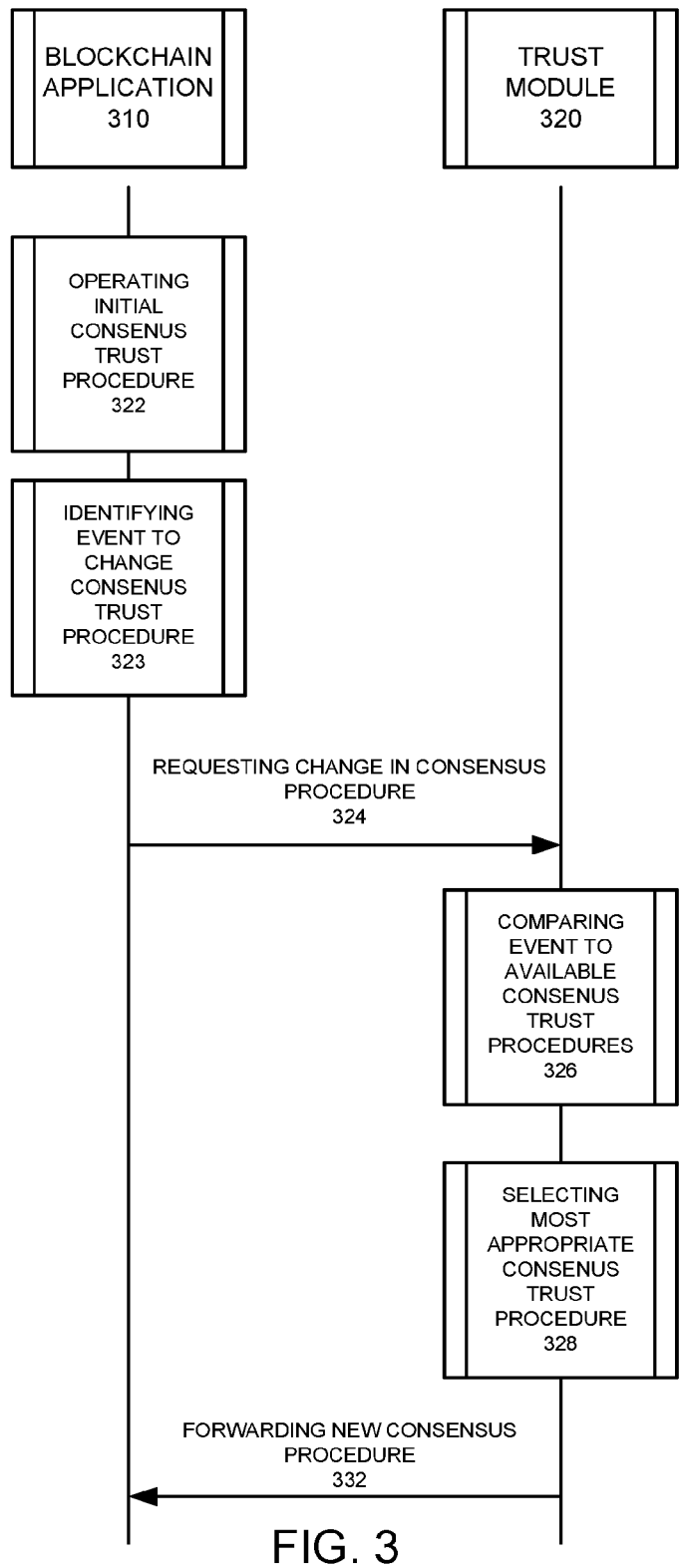
FIG. 3 illustrates a system signaling diagram of a dynamic changing trust configuration according to example embodiments.

FIG. 3 illustrates a system signaling diagram of a dynamic changing trust configuration according to example embodiments. Referring to FIG. 3, the configuration 300 includes a blockchain application 310 operating under a current consensus trust procedure 322. After a certain amount of time, conditions may change, which triggers a change in the blockchain trust procedure that should be used. Such a change could include identifying an event, such as a threshold number of nodes operating in the blockchain, a threshold amount of currency, a threshold operating condition (e.g., CPU usage, memory usage, network resource utilization), and the like. The event 323 could require a change in the consensus procedure used to secure the blockchain 324. The event can be sent to a trust module 320 to compare and identify a particular security procedure as an ideal candidate for the subsequent transactions conducted in the blockchain 326. The most appropriate consensus trust procedure 328 is then selected and forwarded to the blockchain application for future transactions 332 to accommodate the event changes in the blockchain since the previous consensus procedure was used. The security function is referred to as a consensus trust procedure due to the nature of the selection procedure. For example, the rules used to identify a candidate trust procedure may be reached by consensus vote or predefined rules which were agreed upon by validators and/or auditors of the blockchain.

Figure 4A:
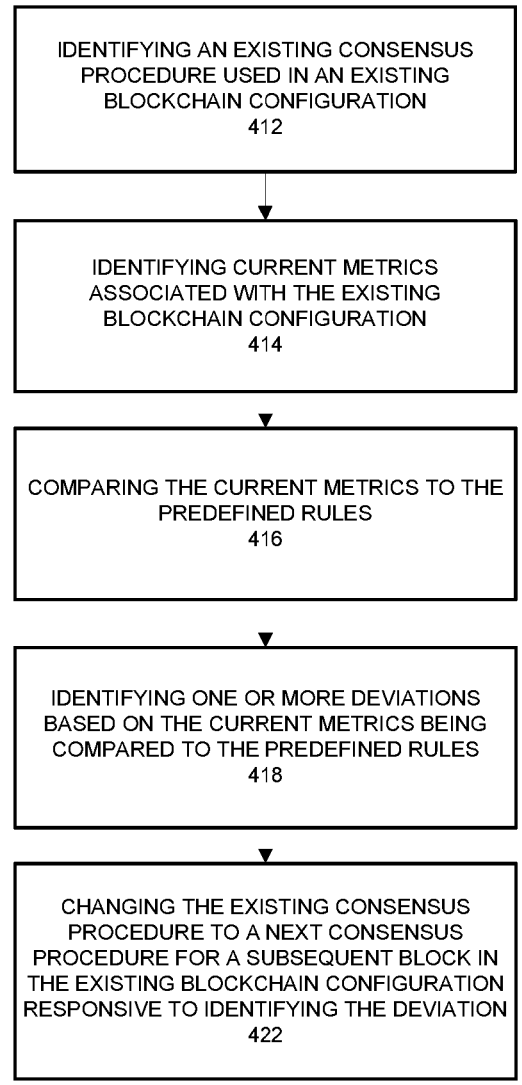
FIG. 4A illustrates a flow diagram of an example method of operation according to example embodiments.

FIG. 4A illustrates a flow diagram of an example method of operation according to example embodiments. Referring to FIG. 4A, the example method may include one or more of identifying an existing consensus procedure used in an existing blockchain configuration 412, identifying current metrics associated with the existing blockchain configuration 414 (e.g., metrics—number of nodes, network resource utilization, currency balance in blockchain, etc.), and comparing the current metrics to the predefined rules 416 defined by validators of the blockchain. Additional operations may include identifying one or more deviations based on the current metrics being compared to the predefined rules 418, the deviations may be thresholds being exceeded, ranges being exceeded, etc. For example, the number of nodes for a current consensus procedure may be 100 and any new members over that number may trigger a response to change the procedure to a more secure procedure. Also, the method can include changing the existing consensus procedure to a next consensus procedure for a subsequent block in the existing blockchain configuration responsive to identifying the at least one deviation 422. The existing consensus procedure could be one or more of PBFT, POW, RAFT, GHOST, and POS and the next consensus procedure could be one or more of PBFT, POW, RAFT, GHOST, and POS. The current metrics may include one or more of memory usage, CPU usage and network bandwidth usage. Also, a value of a crypto-currency associated with the blockchain may be determined as having increased past a crypto-currency threshold level, and the current consensus procedure can then be changed to the next consensus procedure based on the increase in the crypto-currency level past the threshold level. Additionally, a number of network nodes operating with the blockchain may be identified as having increased past a node number threshold level, and the current consensus procedure may be changed to the next consensus procedure based on the increase in the number of network nodes past the node number threshold level. Also, a plurality of network nodes operating on the blockchain may identify the deviations and the existing consensus procedure is then changed based on a consensus vote among the plurality of network nodes.

Another example embodiment may include establishing an overlay network of validators for an existing blockchain configuration. The validators may be selected based on a static policy, such as one or more designated validators based on title or direct assignment or other policies which include a small group of validators and/or a larger group of validators. The trust model will dictate the network of validators and whether they can select a consensus algorithm or not have such rights. Regardless of the specific consensus procedure used, the validator votes may be received for the existing/future consensus procedures used by the existing blockchain configuration and a next consensus procedure can also be identified and used to secure the existing blockchain configuration. A record of the validator votes may be stored for each of the validators and used for reference purposes. A popular vote among the validator votes may be use as the basis to change the consensus procedure to the next consensus procedure, and update the blockchain configuration to start the next consensus procedure. However, the update to the consensus procedure may instead be based on a threshold level, such as a user selected rule that defines a particular metric. For example, a one thousandth or millionth transaction, participating user and/or other numerical indication, etc., may be metrics that are defined by a rule. The rule may provide that when that threshold is reached for that particular metric (i.e., transaction number, etc.), then the consensus algorithm is changed. The next consensus algorithm could be a different trust model or may result in a change to a previous validators status, such as leader, non-leader, voted-out (no longer valid), voted-in (now valid), etc.

An overlay network may include selecting a set of validated nodes, such as a trust network 5 out of 100000 nodes, which are permitted to vote on the consensus based on authority or status. The algorithm may be based on the type of business, computing power, other network factors, various thresholds, and the like. A service level agreement (SLA) may be the terms of that agreement or consensus model. For example, a bank ATM may have a transaction model that should include no more than two minutes per transaction, as its SLA. Assets represent items of value, such as mortgages, houses, cars, money, all of which may exist inside and represented by the blockchain. The metrics are the selection criteria and include attributes such as transactions per second, bandwidth throughput, the cost of processing the blockchain transactions, etc. Any of the metrics could be the threshold/user rule. Other metrics may include a time to process a transaction, a time to validate a transaction, etc. User rules could be based on a threshold and the metrics may be set so that when the metric level doubles or triples, an action is made to change the consensus procedure. One example may be changing a business model from banking to crowdfunding to raise capital.

Figure 4B:
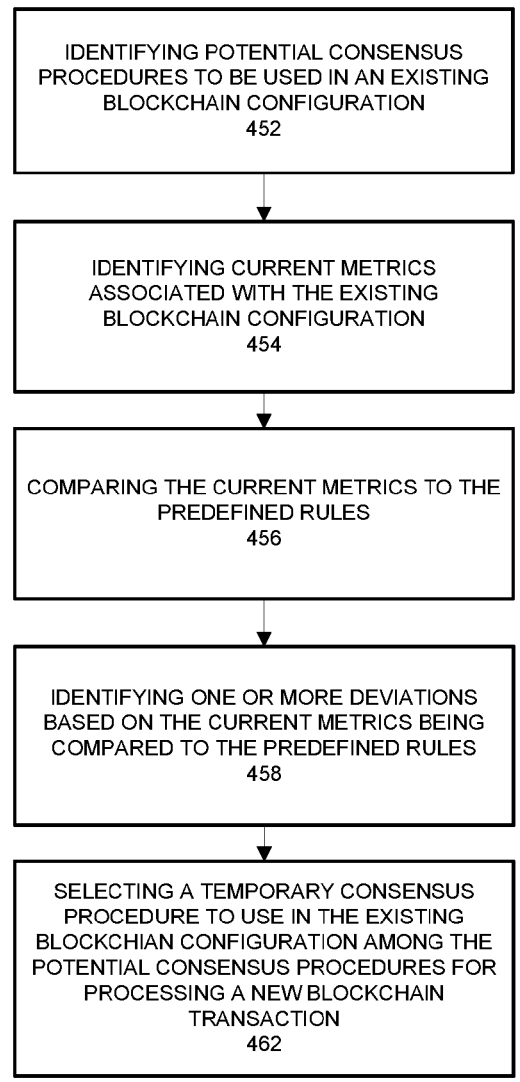
FIG. 4B illustrates another flow diagram of another example method of operation according to example embodiments.

FIG. 4B illustrates a flow diagram of an example method of operation according to example embodiments. Referring to FIG. 4B, the example method may include one or more of identifying potential consensus procedures to be used in an existing blockchain configuration at operation 452, identifying current metrics associated with the existing blockchain configuration 454, comparing the current metrics to predefined rules 456, identifying one or more deviations based on the current metrics being compared to the predefined rules 458, and selecting a temporary consensus procedure to use in the existing blockchain configuration among the potential consensus procedures for processing a new blockchain transaction 462. In this example, the pool of consensus procedures available for selection may be used to assign a consensus procedure for a single transaction. In one example, the transaction itself may have information, such as source information, content, etc., which raises an alert and causes the consensus to be changed for a single transaction (i.e., temporary for one transaction). The temporary consensus procedure assigned may also be assigned for multiple transactions, the expiration of which would yield a reversion back to another consensus procedure or a consensus procedure which was used previously. The deviations which trigger such a temporary consensus procedure assignment may include source information of a recent transaction, content of a recent transaction, etc., or any information which violates an established rule. The temporary consensus procedure may yield a safety procedure which protects the entities processing blockchain transactions.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
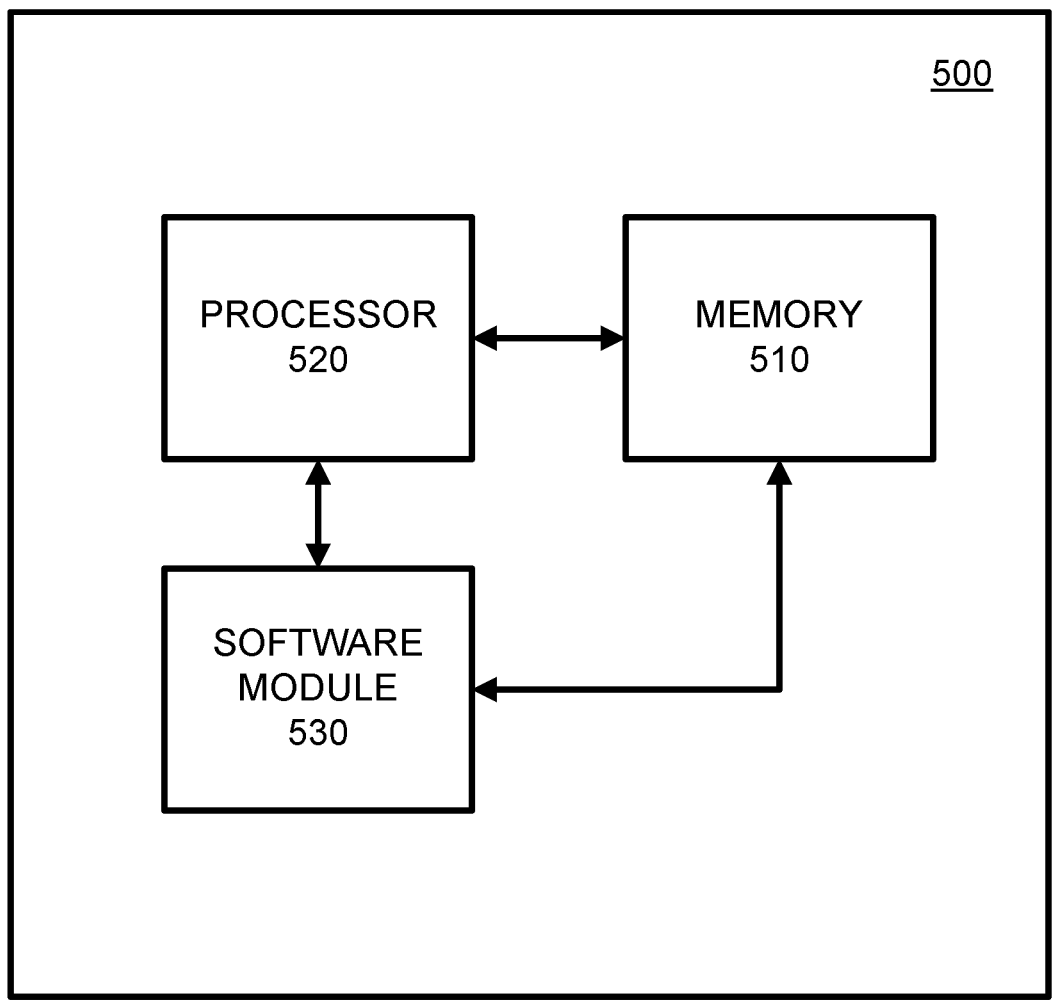
FIG. 5 illustrates an example network entity configured to support one or more of the example embodiments.

As illustrated in FIG. 5, a memory 510 and a processor 520 may be discrete components of a network entity 500 that are used to execute an application or set of operations or steps as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying an existing consensus procedure used in an existing blockchain configuration;
identifying current metrics associated with the existing blockchain configuration;
comparing the current metrics to predefined rules;
identifying one or more deviations based on the current metrics being compared to the predefined rules; and
dynamically changing the existing consensus procedure to a next consensus procedure for subsequent blocks in the existing blockchain configuration responsive to identifying the one or more deviations.

2. The method of claim 1, wherein the existing consensus procedure comprises one or more of Proof Of Work (POW), Proof Of Stake (POS), Practical Byzantine Fault Tolerance (PBFT), Greedy Heaviest Observed Subtree (GHOST), and RAFT.

3. The method of claim 1, wherein the next consensus procedure comprises one or more of PBFT, POW, RAFT, GHOST, and POS.

4. The method of claim 1, wherein the current metrics comprise one or more of memory usage, CPU usage and network bandwidth usage.

5. The method of claim 1, further comprising:
determining a value of a crypto-currency associated with the blockchain has increased past a crypto-currency threshold level; and
changing the current consensus procedure to the next consensus procedure based on the increase in the crypto-currency level past the crypto-currency threshold level.

6. The method of claim 1, further comprising:
determining a number of network nodes operating with the blockchain has increased past a node number threshold level; and
changing the current consensus procedure to the next consensus procedure based on the increase in the number of network nodes past the node number threshold level.

7. The method of claim 1, wherein a plurality of network nodes operating on the blockchain identify the one or more deviations and the existing consensus procedure is changed based on a consensus vote among the plurality of network nodes.

8. The method of claim 1, further comprising one or more of:
establishing an overlay network of validators for the existing blockchain configuration;
receiving validator votes for the existing consensus procedure used by the existing blockchain configuration and the next consensus procedure to be used to secure the existing blockchain configuration;
storing a record of the validator votes for each of the validators;
determining a popular vote among the validator votes to change the consensus procedure to the next consensus procedure; and
updating the blockchain configuration to start the next consensus procedure.

9. An apparatus, comprising:
a processor configured to:
identify an existing consensus procedure used in an existing blockchain configuration;
identify current metrics associated with the existing blockchain configuration;
compare the current metrics to predefined rules;
identify one or more deviations based on the current metrics being compared to the predefined rules; and
dynamically change the existing consensus procedure to a next consensus procedure for subsequent blocks in the existing blockchain configuration responsive to the one or more deviations being identified.

10. The apparatus of claim 9, wherein the existing consensus procedure comprises one or more of PBFT, POW, RAFT, GHOST, and POS.

11. The apparatus of claim 9, wherein the next consensus procedure comprises one or more of PBFT, POW, RAFT, GHOST, and POS.

12. The apparatus of claim 9, wherein the current metrics comprise one or more of memory usage, CPU usage and network bandwidth usage.

13. The apparatus of claim 9, wherein the processor is further configured to
determine a value of a crypto-currency associated with the blockchain has increased past a crypto-currency threshold level, and
change the current consensus procedure to the next consensus procedure based on the increase in the crypto-currency level past the crypto-currency threshold level.

14. The apparatus of claim 9, wherein the processor is further configured to
determine a number of network nodes that operate with the blockchain has increased past a node number threshold level, and
change the current consensus procedure to the next consensus procedure based on the increase in the number of network nodes past the node number threshold level.

15. The apparatus of claim 9, wherein the processor is further configured to perform one or more of:
establish an overlay network of validators for the existing blockchain configuration;
receive validator votes for the existing consensus procedure used by the existing blockchain configuration and the next consensus procedure to be used to secure the existing blockchain configuration;
store a record of the validator votes for each of the validators;

determine a popular vote among the validator votes to change the consensus procedure to the next consensus procedure; and update the blockchain configuration to start the next consensus procedure, and wherein a plurality of network nodes that operate on the blockchain identify the one or more deviations and the existing consensus procedure is changed based on a consensus vote among the plurality of network nodes.

16. A non-transitory computer readable storage medium configured to store instructions that when executed causes a processor to perform:

identifying an existing consensus procedure used in an existing blockchain configuration;
identifying current metrics associated with the existing blockchain configuration;
comparing the current metrics to predefined rules;
identifying one or more deviations based on the current metrics being compared to the predefined rules; and
dynamically changing the existing consensus procedure to the next consensus procedure for subsequent blocks in the existing blockchain configuration responsive to identifying the one or more deviations.

17. The non-transitory computer readable storage medium of claim 16, wherein the existing consensus procedure comprises one or more of PBFT, POW, RAFT, GHOST, and POS, and the next consensus procedure comprises one or more of PBFT, POW, RAFT, GHOST, and POS, and wherein the current metrics comprise one or more of memory usage, CPU usage and network bandwidth usage.

18. The non-transitory computer readable storage medium of claim 16, wherein the processor is further configured to perform:

determining a value of a crypto-currency associated with the blockchain has increased past a crypto-currency threshold level; and
changing the current consensus procedure to the next consensus procedure based on the increase in the crypto-currency level past the crypto-currency threshold level.

19. The non-transitory computer readable storage medium of claim 16, wherein the processor is further configured to perform:

determining a number of network nodes operating with the blockchain has increased past a node number threshold level; and
changing the current consensus procedure to the next consensus procedure based on the increase in the number of network nodes past the node number threshold level.

20. The non-transitory computer readable storage medium of claim 16, wherein the processor is further configured to perform one or more of:

establishing an overlay network of validators for the existing blockchain configuration;
receiving validator votes for the existing consensus procedure used by the existing blockchain configuration and the next consensus procedure to be used to secure the existing blockchain configuration;
storing a record of the validator votes for each of the validators;
determining a popular vote among the validator votes to change the consensus procedure to the next consensus procedure; and
updating the blockchain configuration to start the next consensus procedure.

* * * * *